Dec. 31, 1935.    R. C. BAKER    2,026,295
FISHING TOOL
Filed Nov. 16, 1932    2 Sheets-Sheet 1

INVENTOR.
Reuben C. Baker.
BY Townsend & Loftus
ATTORNEYS.

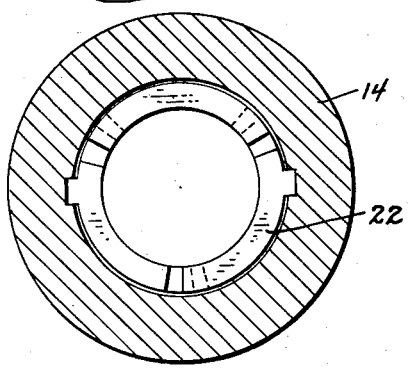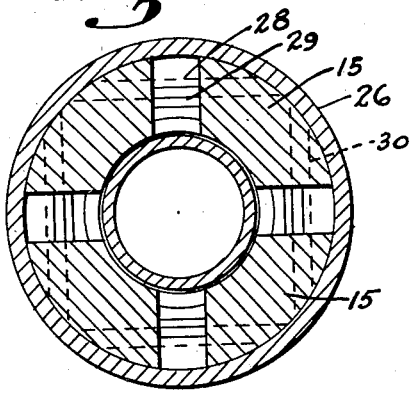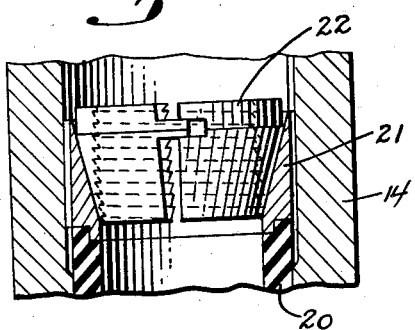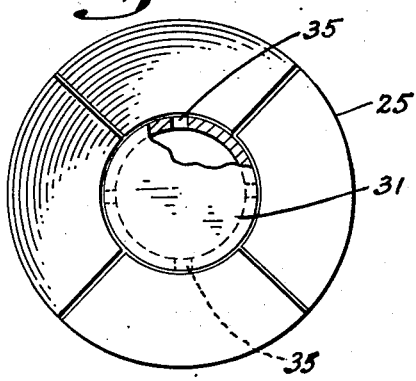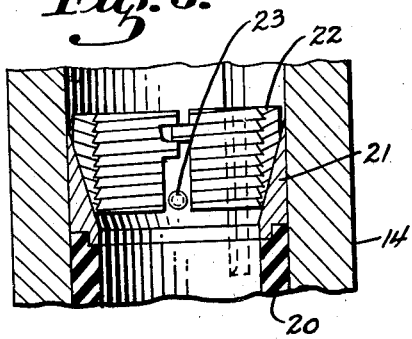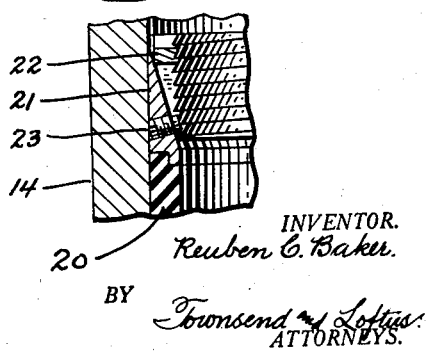

Patented Dec. 31, 1935

2,026,295

UNITED STATES PATENT OFFICE 2,026,295

FISHING TOOL

Reuben C. Baker, Coalinga, Calif., assignor to Baker Oil Tools, Inc., Huntington Park, Calif., a corporation of California Application November 16, 1932, Serial No. 642,878

9 Claims. (Cl. 294—86)

This invention relates to deep well tools and particularly pertains to a fishing tool for recovering drill pipe and like apparatus from a well bore.

It is the principal object of the present invention to provide an improved fishing tool which is provided with an expanding bowl to engage and direct the fish into a barrel where it is gripped in order that it may be elevated, and wherein packing means is provided effective to create a fluid-tight seal between the fish and the interior of the barrel so as to enable circulation to be had through the fish to aid in its recovery.

In carrying the invention into practice, I provide a hollow barrel to be fitted to the lower end of the drilling string. This barrel is provided at its lower end with an expansible bowl which may be expanded through the medium of the circulating fluid under pressure and which is utilized to engage and direct the fish into the barrel. Arranged within the barrel are slips for engaging the fish in order that the same may be elevated with the fishing string. Also disposed in the barrel is a packing means which is actuated when the drilling string is elevated to elevate the fish to create a fluid-tight seal between the interior of the barrel and the exterior of the fish so as to enable the circulating fluid pumped down the fishing string to be forced through the fish to aid in recovering it. If the fish cannot be elevated, the barrel may be actuated to release the slips and thereby release the fish.

One form which the invention may assume is exemplified in the following description and illustrated by way of example in the accompanying drawings, in which:

Fig. 3 is a transverse sectional view through the tool taken on line III—III of Fig. 1.

Fig. 4 is a transverse sectional view taken on line IV—IV of Fig. 1.

Figure 1:
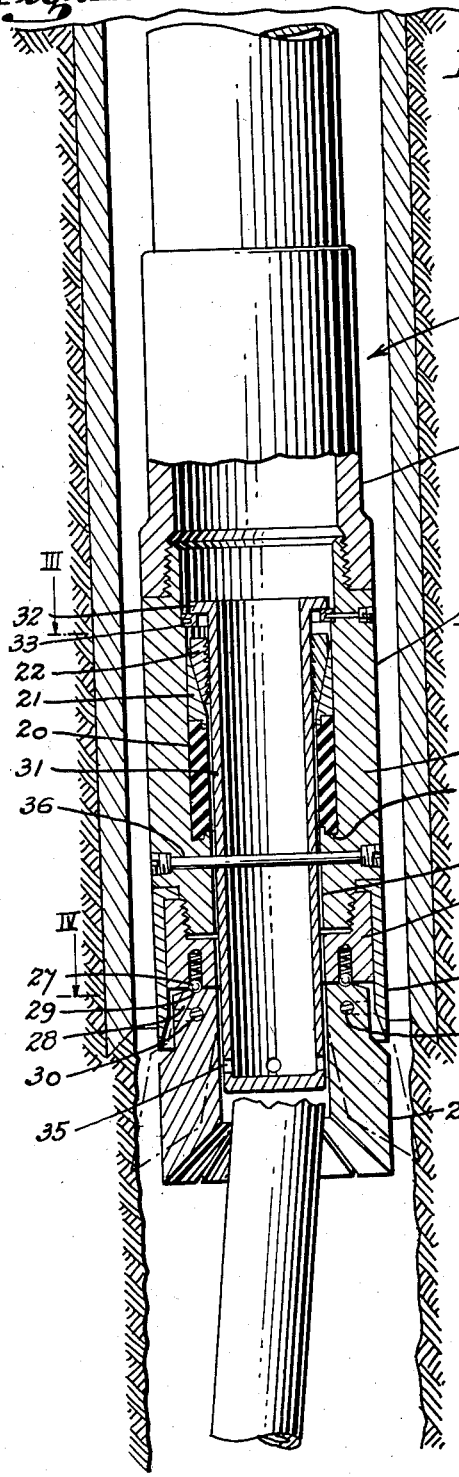
Fig. 1 is a view in central vertical section with certain parts in full through my improved fishing tool showing the position the parts thereof assume when the same is run in the hole.

Figs. 5, 6, and 7 are fragmentary views in vertical section through the barrel showing the construction and arrangement of the slips and slip ring therein.

Fig. 8 is a bottom view of the barrel and the bowl.

Referring more particularly to the accompanying drawings, 10 indicates a fishing tool for recovering drill pipe or the like in a well bore. This fishing tool comprises a barrel 11 which is cylindrical in external contour and which is formed in three parts; to-wit, a hollow cylindrical sub 12, a main body 14, and a bowl head 15. These parts are threadedly connected together to form the barrel 11.

The sub 12 is interiorly threaded at its upper end in order that it may be connected to the lower end of a fishing string 16.

The main body 14 and head 15 are formed with a longitudinal bore, which extends axially therethrough and is formed in an upper section 17 and a lower section 18, the latter being less in diameter than the former so as to form an annular shoulder 19 intermediate the ends of the barrel.

Arranged in the upper section 17 of the bore is a packing sleeve 20 formed of rubber or other suitable material. The interior diameter of this sleeve, when the same is in normal and non-collapsed condition, agrees with the diameter of the lower section 18 of the bore in the barrel.

The lower end of the packing sleeve 20 is anchored to the annular shoulder 19 in the barrel and its upper end is anchored to a slip ring 21, which is reciprocably mounted in the bore of the barrel, but held from rotation by feathered engagement with the barrel. This slip ring has a tapered bore with its largest diameter uppermost.

Nesting in the slip ring are arcuate slips 22 with tapered exterior surfaces complemental to the interior surface of the ring 21. These slips are interengaged to permit relative radial movement therebetween, but to prevent relative movement in an axial direction. Likewise the slips are held from rotation in the ring due to the provision of pins 23 extending radially inwardly from the interior surface of the ring and projecting between the slips as illustrated in Figs. 7 and 8. Left hand wickers are formed in the interior surface of the slips so that they may be unscrewed from the fish and the latter released. Carried by the head is an overshot bowl 25 which is segmental, being formed in four complemental segments which are hinged to the bowl head for radial swinging movement. The interior and exterior diameters of the bowl when contracted agree with those of the barrel. When the bowl is expanded to engage a fish and direct it into the barrel the lower ends of the segments are extended radially as illustrated in dot and dash lines in Fig. 1. The expansion of the bowl is limited by a bowl sleeve 26 carried by the barrel and depending to a position to engage the segments and limit their outward movement.

The bowl is normally held in contracted condition by yielding means which in this instance are the spring pressed latches 27 which engage notches 28 formed in the ears 29 of the segments. These ears are disposed in sockets formed in the head and horizontal hinge pins 30 are projected chord-like through the head and through these ears to provide the hinge mounting for the segments.

When the tool is run in the hole a circulating sleeve 31 is mounted therein. This sleeve is hollow and the lower end is closed as illustrated. The exterior diameter of this sleeve is slightly less than the interior diameter of the lower section of the barrel bore so that it may freely move coaxially of the barrel.

The upper end of the sleeve is formed with a circumscribing annular flange 32 to engage an abutment ring 33 secured in the barrel bore. This ring also acts to limit upward movement of the slips 22.

The sleeve is of a length that its lower end will extend into the bowl 25. At this point the sleeve is formed with radial ports 35 registering with the segments forming the bowl so that when circulating fluid under high pressure is pumped through the barrel it will emanate through the ports 35, impinge on the segments and move the same outwardly to expand the bowl into a position to engage and guide the fish into the barrel.

Figure 2:
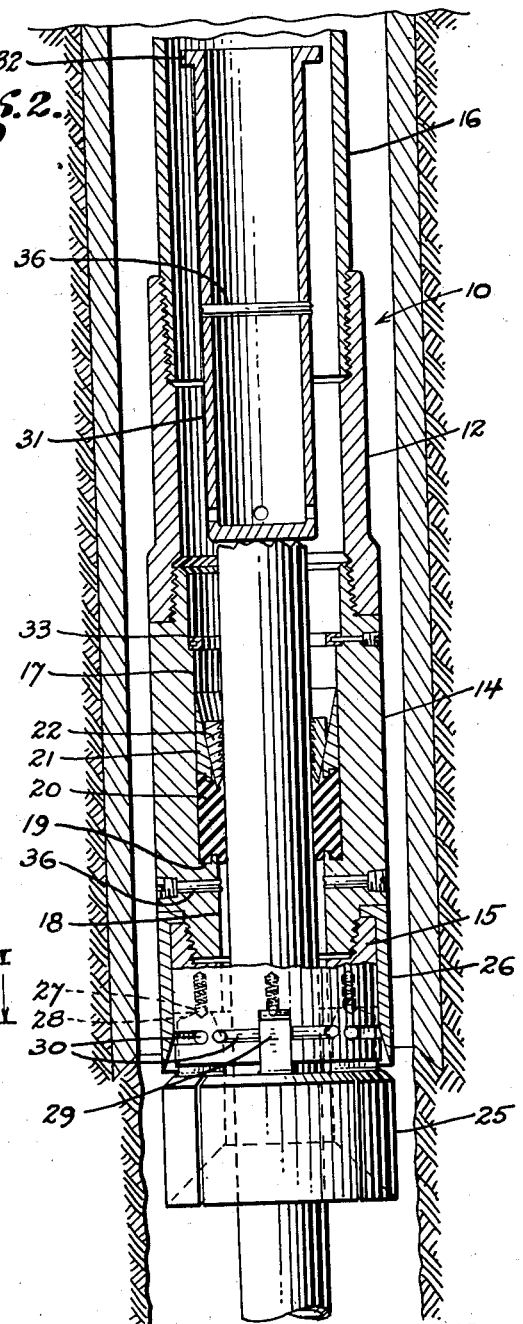
Fig. 2 is a central vertical section through the device with portions thereof shown in full disclosing the position of the parts of the tool when a fish has been engaged and is ready for elevation.

The circulating sleeve is held in position in the barrel by a fragile latch pin 36 extending transversely through the barrel and sleeve. This pin prevents the pressure from moving the sleeve upwardly in the barrel and string when the tool is run in the hole. When a fish is engaged and guided into the barrel it engages the lower end of the sleeve and sufficient weight is then applied to shear the pin 36 and enable the fish to displace the sleeve as shown in Fig. 2.

In operation, the tool is assembled on the lower end of the fishing string and run in the hole with the parts in the position shown in Fig. 1. When the proper level is reached circulation is commenced to cause expansion of the bowl so that it will engage the fish (even if the latter is against the wall of the hole) and guide it into the barrel. As the barrel is lowered over the fish, the latter forces the circulating sleeve upwardly by causing shearing of the pin 36.

After the barrel has been lowered sufficiently to pass the fish through the slips, the barrel is elevated. This contracts the slips to grip the fish and collapses the packing sleeve tightly about the fish. Circulation may then be commenced through the barrel and the fish to aid in releasing the latter. If it cannot be released the barrel may be disconnected therefrom by turning the barrel to cause the slips 26 to unscrew from the fish.

From the foregoing it is obvious that I have provided a tool to engage the fish and elevate it and at the same time pack-off the same to enable circulation to be established through the fish.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A tool of the character described comprising a barrel adapted to be lowered over a fish, an expansible means in the lower end of the barrel for engaging and directing a fish into the barrel, and packing means interiorly of the barrel and capable of operation after the barrel has been lowered over a fish to form a fluid-tight seal between the interior of the barrel and the exterior of the fish, a member in the barrel substantially closing the lower end thereof but capable of being dislodged by the entrance of a fish into the barrel.

2. A tool of the character described comprising a hollow barrel adapted to be lowered into a well bore and over a fish, a segmental overshot bowl at the lower end of the barrel, means for directing fluid under pressure to said bowl to expand the same to enable it to engage and guide a fish into the barrel, a packing sleeve arranged interiorly of the barrel and through which the fish passes, slip means connected with the upper end of the packing sleeve and adapted to engage the fish whereby upward movement of the barrel relative to the fish will cause the packing sleeve to tightly pack-off around the fish.

3. A tool of the character described comprising a hollow barrel, an overshot bowl at the lower end of the barrel, said overshot bowl formed of a plurality of complemental segments hinged to the lower end of the barrel for radial swinging movement, and means carried by the barrel thereof and for directing a stream of fluid under high pressure against said segments to expand the bowl after the barrel has been lowered into a well bore.

4. A tool of the character described comprising a hollow barrel, an overshot bowl at the lower end of the barrel, said overshot bowl formed of a plurality of complemental segments hinged to the lower end of the barrel for radial swinging movement, and means carried by the barrel thereof and for directing a stream of fluid under high pressure against said segments to expand the bowl after the barrel has been lowered into a well bore, said means being displaceable by a fish entering the barrel, and means for normally maintaining the bowl contracted whereby it may be freely lowered into a well bore.

5. A tool of the character described comprising a hollow barrel, an overshot bowl at the lower end of the barrel, said overshot bowl formed of a plurality of complemental segments hinged to the lower end of the barrel for radial swinging movement, and means carried by the barrel thereof and for directing a stream of fluid under high pressure against said segments to expand the bowl after the barrel has been lowered into a well bore, a packing sleeve arranged interiorly of the barrel about the inner periphery thereof and through which the fish passes, slip means connected with the packing sleeve and capable of gripping the fish and of causing the sleeve to pack-off around the fish when the barrel is moved upwardly relative to the fish.

6. A tool of the character described comprising a barrel adapted to be lowered into a well bore and over a fish therein, packing means arranged interiorly of the barrel, gripping means connected with the packing means and adapted to engage a fish projected upwardly into the barrel and expand the packing means when the barrel is moved upward relative to the fish and thereby form a fluid-tight seal between the interior of the barrel and the exterior of the fish, expansible means at the lower end of the barrel operative when the barrel has been lowered into a well bore to expand and direct a fish into the barrel, a member arranged in the barrel to substantially plug the same during the period the barrel is lowered into the well bore, fragile means connecting said member to the barrel and capable of being disrupted when a fish is engaged by the barrel to enable said member to be moved upwardly into the barrel in advance of the fish.

7. A tool of the character described comprising a hollow barrel, an expansible overshot bowl at the lower end of the barrel, and means for directing fluid under pressure against the interior of the bowl to expand the same.

8. A tool of the character described comprising a hollow barrel, an expansible overshot bowl at the lower end of the barrel, and means for directing fluid under pressure against the interior of the bowl to expand the same, said means being displaceable by a fish entering the barrel.

9. A tool of the character described comprising a hollow barrel, an overshot bowl at the lower end of the barrel, a member substantially fitting the interior of the barrel at the lower end thereof to substantially close the same while the barrel is being lowered into a well bore, said member having an obstructed lower end which end extends to within the bowl prior to engagement of the tool with the fish, said member being capable of being engaged by and dislodged and moved upwardly by a fish into the barrel when the barrel is lowered over a fish and the latter engages said member.

REUBEN C. BAKER.